(12) United States Patent
Schellinger

(10) Patent No.: US 10,655,942 B2
(45) Date of Patent: May 19, 2020

(54) REDUCED DIAMETER BOW FISHING ARROW

(71) Applicant: AMS, LLC, Stratford, WI (US)

(72) Inventor: Kevin Schellinger, Mosinee, WI (US)

(73) Assignee: AMS, LLC, Stratford, WI (US)

( * ) Notice: Subject to any disclaimer, the term of this patent is extended or adjusted under 35 U.S.C. 154(b) by 0 days.

(21) Appl. No.: 16/000,475

(22) Filed: Jun. 5, 2018

(65) Prior Publication Data
US 2018/0347954 A1 Dec. 6, 2018

Related U.S. Application Data

(60) Provisional application No. 62/515,100, filed on Jun. 5, 2017.

(51) Int. Cl.
*F42B 6/02* (2006.01)
*A01K 81/00* (2006.01)

(52) U.S. Cl.
CPC ............... *F42B 6/02* (2013.01); *A01K 81/00* (2013.01)

(58) Field of Classification Search
CPC ..... F42B 6/02; F42B 6/04; F42B 6/08; A01K 81/00; A01K 81/04
USPC ...................................................... 473/578
See application file for complete search history.

(56) References Cited

U.S. PATENT DOCUMENTS

| | | | | |
|---|---|---|---|---|
| 2,747,876 A * | 5/1956 | Teller | ......................... | F42B 6/04 473/585 |
| 4,252,325 A * | 2/1981 | Weems | ................. | F42B 12/362 473/581 |
| 4,410,183 A * | 10/1983 | Miller | ....................... | F42B 6/04 473/578 |
| 4,651,999 A * | 3/1987 | Sturm | ....................... | F42B 6/04 473/575 |
| 4,795,165 A * | 1/1989 | Tehan | ....................... | F42B 6/04 473/578 |
| 4,807,382 A * | 2/1989 | Albrecht | ................. | A01K 81/00 43/6 |
| 4,836,557 A * | 6/1989 | Polando | ................. | F42B 12/362 473/578 |
| 4,900,038 A * | 2/1990 | Czetto | ....................... | F42B 6/02 473/570 |
| 5,123,657 A * | 6/1992 | Colt | .......................... | F42B 6/04 473/575 |
| 5,234,220 A * | 8/1993 | Schellhammer | .......... | F42B 6/04 156/180 |
| 6,361,451 B1 * | 3/2002 | Masters | ................. | A01K 87/00 473/318 |
| 6,554,725 B1 * | 4/2003 | Schaar | ...................... | F42B 6/04 473/578 |
| 6,558,280 B1 * | 5/2003 | Kuhn | ......................... | F42B 6/04 473/578 |
| 6,595,868 B1 * | 7/2003 | Androlia | ................... | F42B 6/04 473/318 |

(Continued)

*Primary Examiner* — Alexander R Niconovich
(74) *Attorney, Agent, or Firm* — Boyle Fredrickson S.C.

(57) ABSTRACT

A bowfishing arrow shaft is provided with a carbon fiber bow fishing arrow providing an outer tube with an internal wire rope. In this regard the wire rope provides added weight while being ductile to prevent damage to the carbon fiber tube or holding a "kink" preventing the arrow from fully returning to a straight configuration after extreme flexure of the carbon fiber tube which would otherwise be accommodate.

18 Claims, 2 Drawing Sheets

(56) References Cited

U.S. PATENT DOCUMENTS

| | | | | |
|---|---|---|---|---|
| 6,612,947 B2 * | 9/2003 | Porter | F42B 12/385 | 473/578 |
| 7,464,497 B2 * | 12/2008 | Rogers | A01K 81/04 | 43/6 |
| 7,909,714 B2 * | 3/2011 | Cyr | F42B 6/06 | 473/578 |
| 8,241,156 B2 * | 8/2012 | Sims | F42B 6/04 | 473/578 |
| 8,267,815 B2 * | 9/2012 | Braun | A63B 65/02 | 473/578 |
| 8,388,473 B2 * | 3/2013 | Smith | F42B 6/04 | 473/578 |
| 8,696,498 B1 * | 4/2014 | Andrus | F42B 12/362 | 473/578 |
| 8,764,591 B2 * | 7/2014 | Hand | F42B 6/08 | 473/578 |
| 8,876,640 B2 * | 11/2014 | Connolly | F42B 10/00 | 473/578 |
| 8,915,807 B1 * | 12/2014 | Olson | F42B 6/04 | 473/578 |
| 8,992,354 B1 * | 3/2015 | Chieppo | F42B 6/04 | 473/578 |
| 9,011,280 B2 * | 4/2015 | Gartland | F42B 6/02 | 473/578 |
| 9,228,812 B1 * | 1/2016 | White | F42B 6/04 | |
| 9,470,487 B2 * | 10/2016 | Hand | F42B 6/08 | |
| 9,644,927 B2 * | 5/2017 | Connolly | F42B 6/04 | |
| 2006/0084534 A1 * | 4/2006 | Flowers | F42B 6/04 | 473/578 |
| 2006/0154756 A1 * | 7/2006 | Shao | F42B 6/003 | 473/578 |
| 2010/0137080 A1 * | 6/2010 | Cyr | F42B 6/04 | 473/575 |
| 2017/0086433 A1 * | 3/2017 | Braun | A01K 81/04 | |

\* cited by examiner

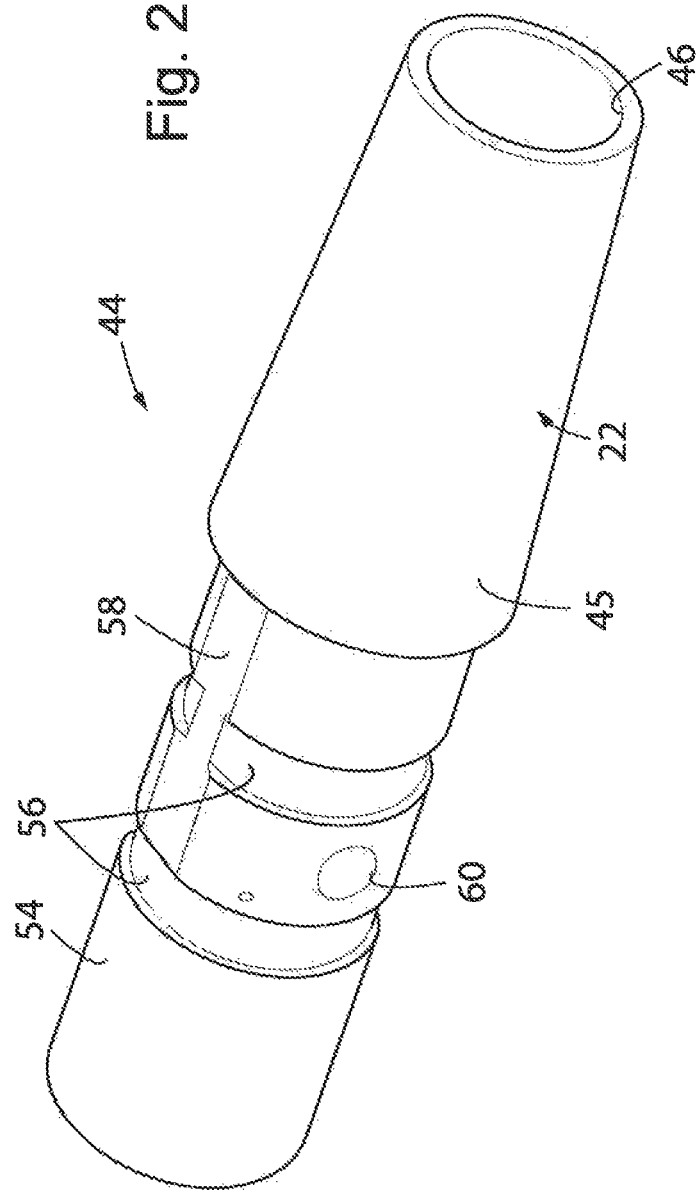
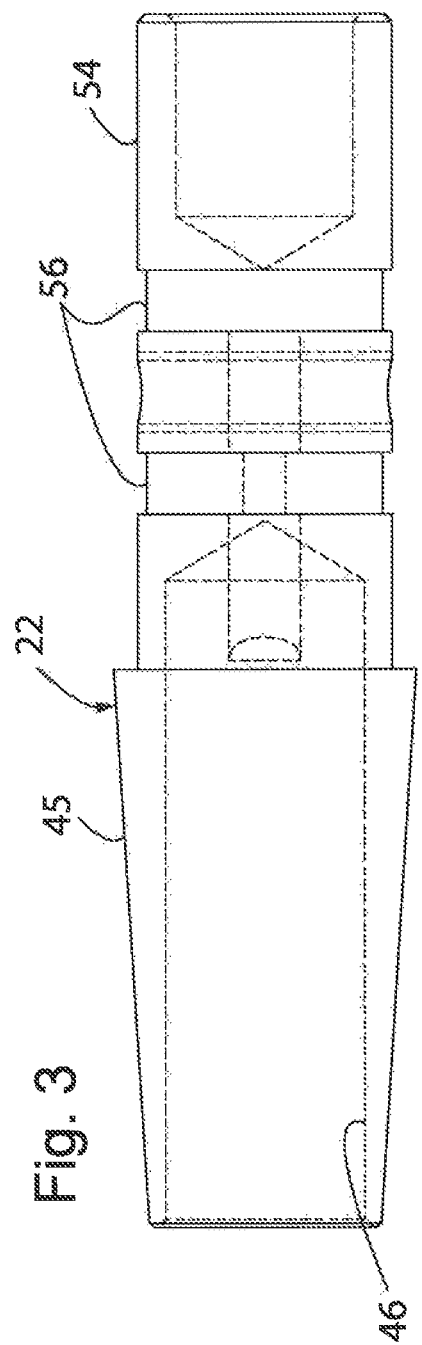

REDUCED DIAMETER BOW FISHING ARROW

CROSS REFERENCE TO RELATED APPLICATION

This application claims the benefit of U.S. provisional application 62/515,100 filed Jun. 5, 2017, and hereby incorporated by reference.

BACKGROUND OF THE INVENTION

The present invention relates to archery arrows and in particular to an arrow suitable for use in bowfishing.

Bowfishing arrows differ from arrows used in other types of hunting primarily in weight and strength, such arrows having increased weight in order to carry a bowfishing line successfully through water, and greater strength to resist impacts with stones and the like under the water surface. A common bowfishing arrow provides a 5/16-inch solid fiberglass shaft. Carbon fiber/fiberglass composite arrows also used for bowfishing commonly have a diameter of a 5/16 or 22/64 inch. Carbon fiber/fiberglass arrows can provide for improved straightness but have poor ability to carry a line through the water.

SUMMARY OF THE INVENTION

The present invention combines a carbon fiber bow fishing arrow providing an outer tube with an internal wire rope. The inventors have determined that the wire rope can be incorporated into a carbon fiber without adversely affecting its stiffness, straightness, or robustness against damage on impact. In this regard, the wire rope provides added weight while being ductile to prevent damage to the carbon fiber tube or holding a "kink" preventing the arrow from fully returning to a straight configuration after extreme flexure of the carbon fiber tube which would otherwise be accommodated.

In one embodiment, the present invention provides a bowfishing arrow shaft having a carbon fiber composite tube having a central lumen and a ductile ferrous insert fitting within the lumen.

It is thus a feature of at least one embodiment of the invention to provide a ductile core resistant to permanent kinks when compressed upon impact.

The ductile ferrous insert may be a wire rope. The wire rope may be arranged according to 7×7 aircraft cable. The ductile ferrous insert may be arranged according to 7×19 aircraft cable. The wire rope may be comprised of steel fibers having a diameter less than 1/50 the diameter shaft.

It is thus a feature of at least one embodiment of the invention to use an inherently flexible material that has less chance of warping the carbon tube.

The wire rope may be free to slide along the inner walls of the composite tube with shock. The ductile ferrous insert may have a diameter less than the internal diameter of the central lumen.

It is thus a feature of at least one embodiment of the invention to reduce the chance that kinks in the wire rope will affect the carbon fiber tube and provide absorption of impact forces and energy dissipation.

The ductile ferrous insert may increase a weight of the shaft by at least 100 percent. The ductile ferrous insert may extend substantially an entire length of the shaft.

It is thus a feature of at least one embodiment of the invention to improve penetration and flight of the shaft through water.

A diameter of the composite tube may be between 0.2 and 0.4 inches. A length of the composite tube may be between 20 and 35 inches long.

It is thus a feature of at least one embodiment of the invention to provide a narrow arrow to provide less water resistance.

The tubular outer shaft may be carbon fibers embedded in a matrix material. The matrix material may be a thermosetting polymer resin of at least one of a polyester and epoxy.

The bowfishing arrow shaft of may include an arrow tip having a rearward bore receiving a front end of the composite tube to align the arrow tip with the arrow axis.

The bowfishing arrow shaft of may include an arrow tip adapter that has a rearward bore adapted to receive a forward cylindrical boss of the composite tube to align the arrow tip with the arrow axis and a forward cylindrical boss adapted to be received within a rear bore of the arrow tip.

The arrow tip adapter may have a diametric threaded bore passing through the forward cylindrical boss of the arrow tip adapter to allow a retaining screw to pass through a hole in an outer wall forming the rear bore of the arrow tip and the diametric threaded bore to the arrow tip adapter to the arrow tip.

An outer surface of the arrow tip adapter may increase in diameter from the arrow shaft to the arrow tip.

The forward cylindrical boss of the arrow tip adapter may have circumferential grooves for receiving adhesive to provide a press fit between the arrow tip and the arrow tip adapter.

One embodiment of the present invention may provide a bowfishing arrow assembly having a carbon fiber composite tube having a central lumen; a ductile ferrous insert fitting within the lumen; a nock having a bifurcated rearward portion providing opposed fingers for fitting a bowstring therebetween and having a forward portion adapted to interfit with the rear end of the arrow shaft to align the nock with the arrow axis; and an arrow tip having a pointed forward portion and a rearward portion adapted to interfit with the front end of the composite tube to align the arrow tip with the arrow axis.

These particular objects and advantages may apply to only some embodiments falling within the claims and thus do not define the scope of the invention.

BRIEF DESCRIPTION OF THE DRAWINGS

FIG. 2 is a perspective view of an arrowhead adapter for use with the arrow of the present invention; and FIG. 3 is a side elevational view of the arrowhead adapter of FIG. 2 providing hidden lines for showing internal structure.

DETAILED DESCRIPTION OF THE PREFERRED EMBODIMENT

Figure 1:
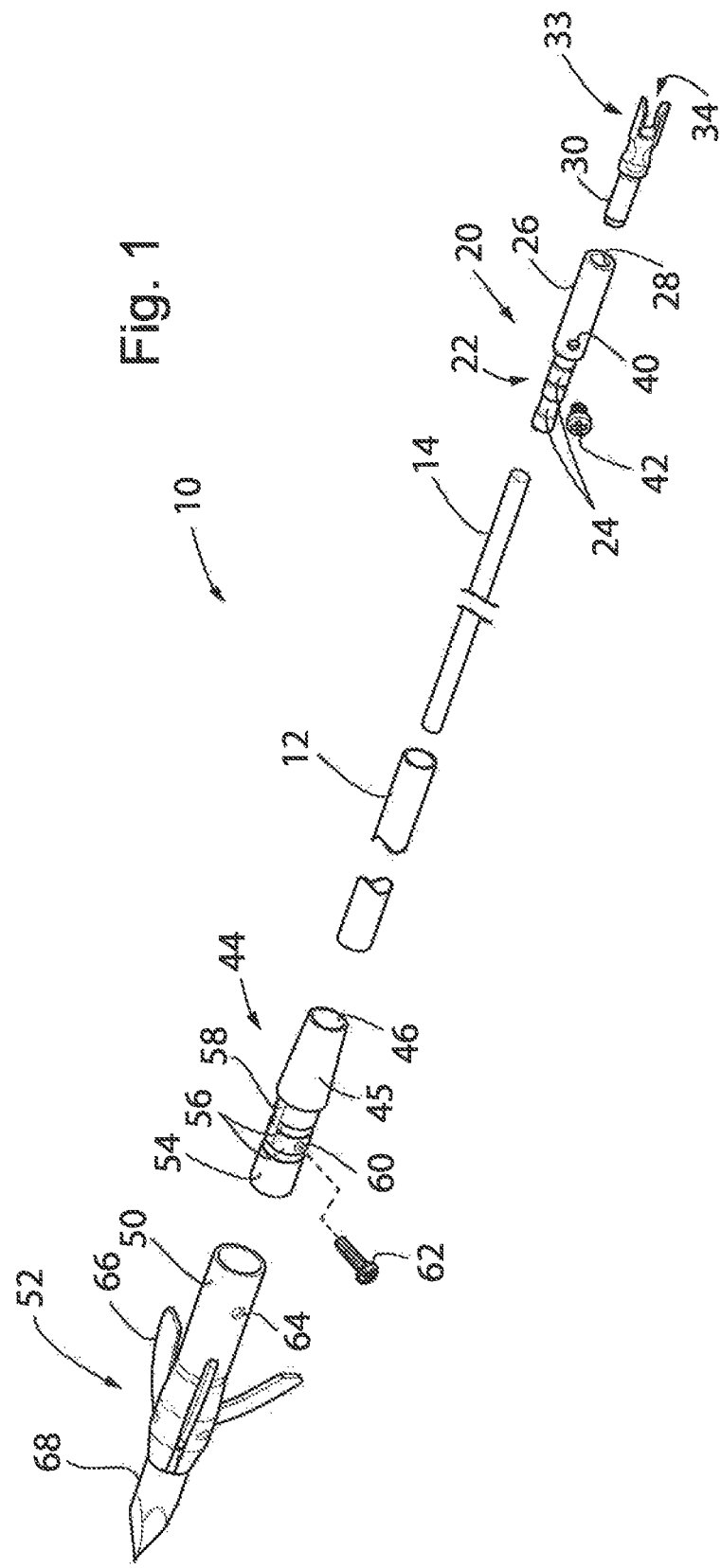
FIG. 1 is an exploded fragmentary view of an arrow shaft incorporating the present invention.

Referring now to FIG. 1, an arrow 10 constructed according to the present invention may provide for a tubular outer shaft 12 formed of a composite of carbon fibers and polymer matrix material. The matrix material may be a thermosetting polymer resin made of polyester and/or epoxy. In one embodiment, the outer diameter of the carbon fiber shaft 12 may be between 0.2 and 0.4 inches or substantially 0.25 inches. In one embodiment, the length of the carbon fiber shaft 12 may be between 20 and 35 inches long or substantially 32 inches long.

Arranged coaxially within the tube of the outer shaft 12 and extending substantially an entire length of the outer shaft 12 is a ductile ferrous insert such as wire rope 14 constructed of axially flexible twisted steel fibers. The wire rope 14 may be held slidably (free to slide without adhesive) within the tube of the outer shaft 12. Axial motion of the wire rope 14 is prevented by slight friction between the walls of the outer tube and the wire rope 14 and slight axial compression of the wire rope 14 by nock fixture 20 and arrow tip fixture 44. The nock fixture 20 and arrow tip fixture 44 attached to opposite ends of the outer shaft 12 providing opposed surfaces that abut the ends of the wire rope 14 preventing axial movement. Ideally, the outer dimension of the wire rope 14 is less than but close to the inner dimension of the outer shaft 12 to provide a sliding fit.

Desirably, the wire rope 14 has sufficient flexibility to flex with flexure of the outer shaft 12 without holding a bent shape and without materially changing the stiffness of the outer shaft 12 within the range of non-yielding compliance of the outer shaft 12. The steel fibers of the wire rope 14 may have a diameter less than $\frac{1}{50}$ of the diameter shaft or a diameter between 0.004-0.008 inches. The wire rope 14 may be arranged, for example, according to a 7×7 or 7×19 aircraft cable.

Ideally the wire rope 14 increases the weight of the carbon fiber shaft 12 by an amount no less than an equivalent amount of carbon fiber composite (that is as if a carbon fiber shaft 12 or solid) and preferably more than doubles the weight of the carbon fiber shaft 12. The wire rope 14 may increase the weight of the carbon fiber shaft 12 by at least 50-100%.

The nock fixture 20 may have a plug end 22 of diameter comparable to that of the wire rope 14 but providing a press fit with the shaft 12 that may be augmented by adhesive to attach the nock fixture 20 to the shaft 12. The plug end 22 may be substantially cylindrical with glue pockets 24 of slightly reduced diameter cut circumferentially therearound, Attached to the plug end 22 and extending in axial alignment rearwardly therefrom is a nock socket 26 having an outer diameter substantially equal to the outer diameter of the outer shaft 12 and an axial inner bore 28 sized to receive a corresponding plug 30 of a nock 32. The nock 32 may be of standard commercial design including a string-receiving slot 34 having a cut plane aligned with an axis of the plug 30 and having a size to receive a bowstring. The nock socket 26 may include a threaded radial bore 40 for receiving a stop screw 42 used to block rearward travel of a slide used to attach the arrow 10 to a bowfishing line (not shown), for example, as taught by U.S. Pat. No. 6,517,453 entitled: "Bow Fishing Arrow Attachment" assigned to the assignee of the present invention and hereby incorporated by reference.

Referring now also to FIGS. 2 and 3, arrow tip fixture 44 may provide for a socket end 45 receiving within an inner axial bore 46 of the socket end 45, the outer surface of the front end of the shaft 12 to be held thereto in a press fit as augmented by adhesive. The outer surface of the socket end 45 may flare to a larger diameter toward the arrow tip so that it conforms to an outer diameter of a tubular rear socket 50 of an arrow point assembly 52 that will be attached to the arrow tip fixture 44. In this regard, the socket end 45 may attach to a forwardly extending cylindrical boss 54 fitting within the tubular rear socket 50 of the arrow point assembly 52 so that a front edge of the flaring socket end 45 may abut a rear edge of the tubular rear socket 50. The cylindrical boss 54 may include circumferential grooves 56 for receiving adhesive to provide a press fit augmented by adhesive attachment between the cylindrical boss 54 to the socket 50. The circumferential grooves 56 may intercommunicate by means of an axial glue relief slot 58.

A diametric threaded bore 60 may pass through the cylindrical boss 54 at about half of its length to allow a retaining screw 62 to pass through a hole 64 in a wall of the tubular rear socket 50 to be received by the threaded bore 60 to retain the arrow point assembly 52 on to the point assembly 52.

The point assembly 52 itself may be of conventional design having pivotable arms 66 that help retain the fish after the arrow point 68 passes through the fish and the arrow is pulled back during retrieval. An example tip is described in U.S. Pat. No. 9,146,085 assigned to the assignee of the present invention and hereby incorporated by reference.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a" "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

What I claim is:
1. A bowfishing arrow shaft comprising:
a carbon fiber composite tube having a central lumen; and
a ferrous insert fitting within the lumen;
wherein the ferrous insert is a multistrand wire rope extending continuously along a length of the shaft;
wherein the wire rope is held slidably without adhesive within the lumen.
2. The bowfishing arrow shaft of claim 1 wherein the wire rope is free to slide along inner walls of the composite tube with shock.

3. The bowfishing arrow shaft of claim 1 wherein the wire rope is arranged as 7×7 aircraft cable.

4. The bowfishing arrow shaft of claim 1 wherein the wire rope is arranged as 7×19 aircraft cable.

5. The bowfishing arrow shaft of claim 1 wherein the ferrous insert increases a weight of the shaft by at least 100 percent.

6. The bowfishing arrow shaft of claim 1 wherein the ferrous insert extend substantially an entire length of the shaft.

7. The bowfishing arrow shaft of claim 1 wherein the ferrous insert has a diameter less than an internal diameter of the central lumen.

8. The bowfishing arrow shaft of claim 1 wherein the ferrous insert is comprised of steel fibers having a diameter less than $1/50$ a diameter of the shaft.

9. The bowfishing arrow shaft of claim 1 wherein the composite tube is comprised of carbon fibers embedded in a matrix material.

10. The bowfishing arrow shaft of claim 9 wherein the matrix material is comprised of a thermosetting polymer resin of at least one of a polyester and epoxy.

11. The bowfishing arrow shaft of claim 1 further including an arrow tip having a rearward bore receiving a front end of the composite tube to align the arrow tip with an arrow axis.

12. The bowfishing arrow shaft of claim 11 further including an arrow tip adapter that has a rearward bore adapted to receive a forward cylindrical boss of the composite tube to align the arrow tip with the arrow axis and a forward cylindrical boss adapted to be received within a rear bore of the arrow tip.

13. The bowfishing arrow shaft of claim 12 wherein the arrow tip adapter has a diametric threaded bore passing through the forward cylindrical boss of the arrow tip adapter to allow a retaining screw to pass through a hole in an outer wall forming the rear bore of the arrow tip and the diametric threaded bore to retain the arrow tip adapter to the arrow tip.

14. The bowfishing arrow shaft of claim 12 wherein an outer surface of the arrow tip adapter increases in diameter from the composite tube to the arrow tip.

15. The bowfishing arrow shaft of claim 12 wherein the forward cylindrical boss of the arrow tip adapter has circumferential grooves for receiving adhesive to provide a press fit between the arrow tip and the arrow tip adapter.

16. The bowfishing arrow shaft of claim 1 wherein a diameter of the composite tube is between 0.2 and 0.4 inches.

17. The bowfishing arrow shaft of claim 1 wherein a length of the composite tube is between 20 and 35 inches long.

18. A bowfishing arrow assembly comprising:
a carbon fiber composite tube having a central lumen;
a ferrous insert fitting within the lumen wherein the ferrous insert is a multistrand wire rope extending continuously along a length of the shaft and held slidably without adhesive within the lumen;
a nock having a bifurcated rearward portion providing opposed fingers for fitting a bowstring therebetween and having a forward portion adapted to interfit with a rear end of the composite tube to align the nock with an arrow axis; and
an arrow tip having a pointed forward portion and a rearward portion adapted to interfit with a front end of the composite tube to align the arrow tip with the arrow axis.

* * * * *